United States Patent [19]

Schiel

[11] Patent Number: 5,538,228
[45] Date of Patent: Jul. 23, 1996

[54] TENSION BARS FOR ROLL PRESS FOR PAPER MAKING MACHINE

[75] Inventor: Christian Schiel, Heidenheim, Germany

[73] Assignee: J.M. Voith GmbH, Germany

[21] Appl. No.: 129,630

[22] Filed: Sep. 30, 1993

Related U.S. Application Data

[62] Division of Ser. No. 946,325, Nov. 6, 1992, Pat. No. 5,291,826.

[30] Foreign Application Priority Data

Mar. 28, 1991 [DE] Germany ............... 41 10 205.3

[51] Int. Cl.[6] ................................................. B30B 3/00
[52] U.S. Cl. ................. 267/73; 267/158; 267/160
[58] Field of Search ........................ 267/73, 74, 158, 267/160

[56] References Cited

U.S. PATENT DOCUMENTS

| 2,753,176 | 7/1956 | List | 267/160 |
|---|---|---|---|
| 3,921,514 | 11/1975 | Biondetti | 100/162 B |
| 4,272,317 | 6/1981 | Roerig | 162/272 |
| 4,503,765 | 3/1985 | Schiel | 100/118 |
| 4,667,921 | 5/1987 | de Goncourt | 267/158 |
| 5,062,656 | 11/1991 | Hynds et al. | 267/180 |

FOREIGN PATENT DOCUMENTS

| 0328844 | 8/1989 | European Pat. Off. . | |
| 8232424 | 8/1985 | Germany . | |
| 59-29829 | 2/1984 | Japan | 267/158 |
| 3229027 | 10/1991 | Japan | 267/160 |
| 6814378 | 10/1969 | Netherlands . | |

*Primary Examiner*—Matthew C. Graham
*Attorney, Agent, or Firm*—Ostrolenk, Faber, Gerb & Soffen

[57] ABSTRACT

The axes of a first press roll (1) and of a second press roll (3) lie in a press plane (E). Each of the press rolls has a journal pin (2) and (4), respectively. The first press roll is supported in a first bearing pedestal (5). The second press roll rests in a second bearing pedestal (6) which is coupled to the first bearing pedestal (5) by utilizing flexurally soft tension bars (7, 8). In the unloaded condition of the roll press, the second bearing pedestal (6) rests on the first bearing pedestal (5). In the loaded condition, play (p) is established between the bearing pedestals (5 and 6) so that the bearing pedestals (5 and 6) are displaceable axially relative to each other.

17 Claims, 6 Drawing Sheets

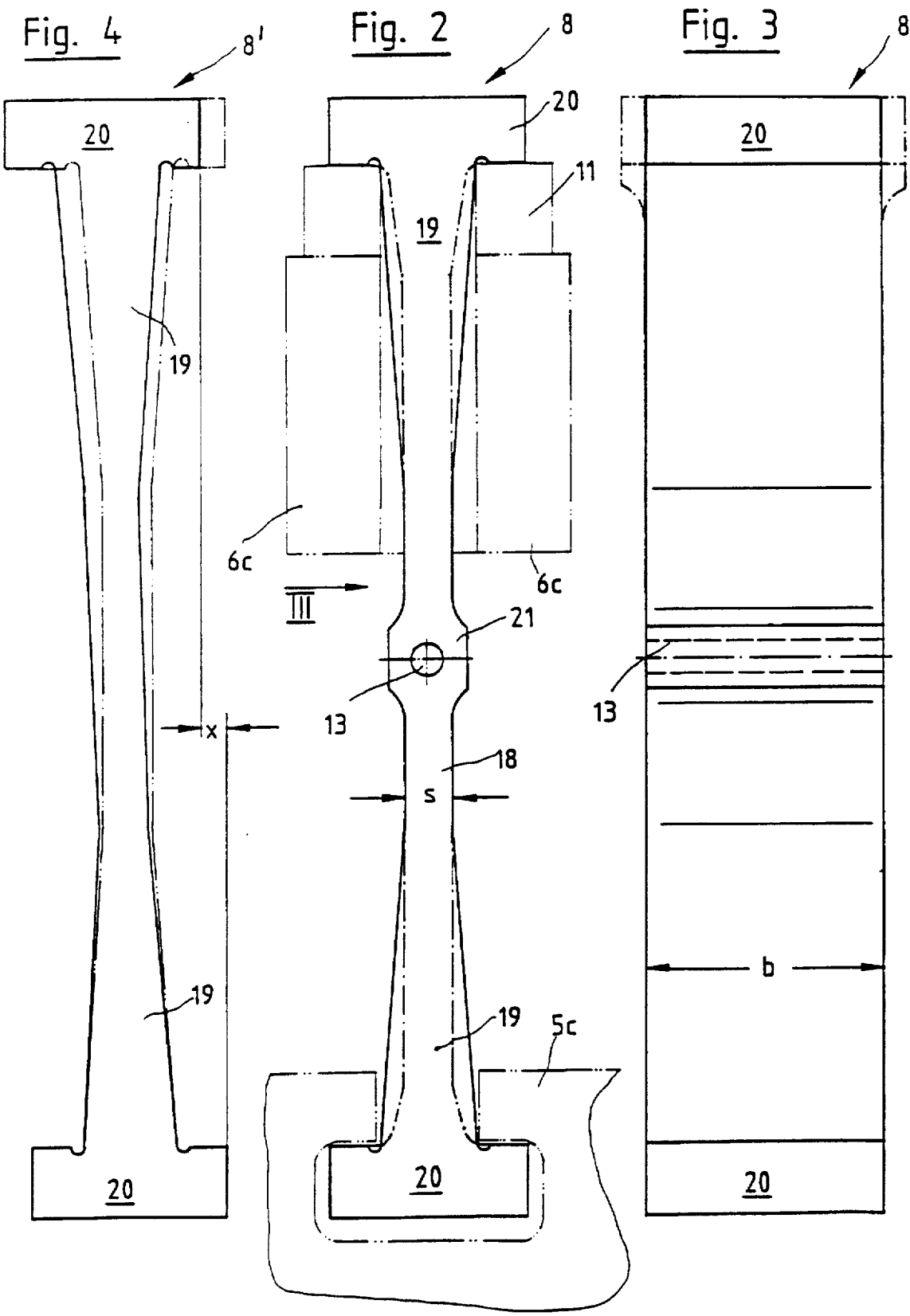

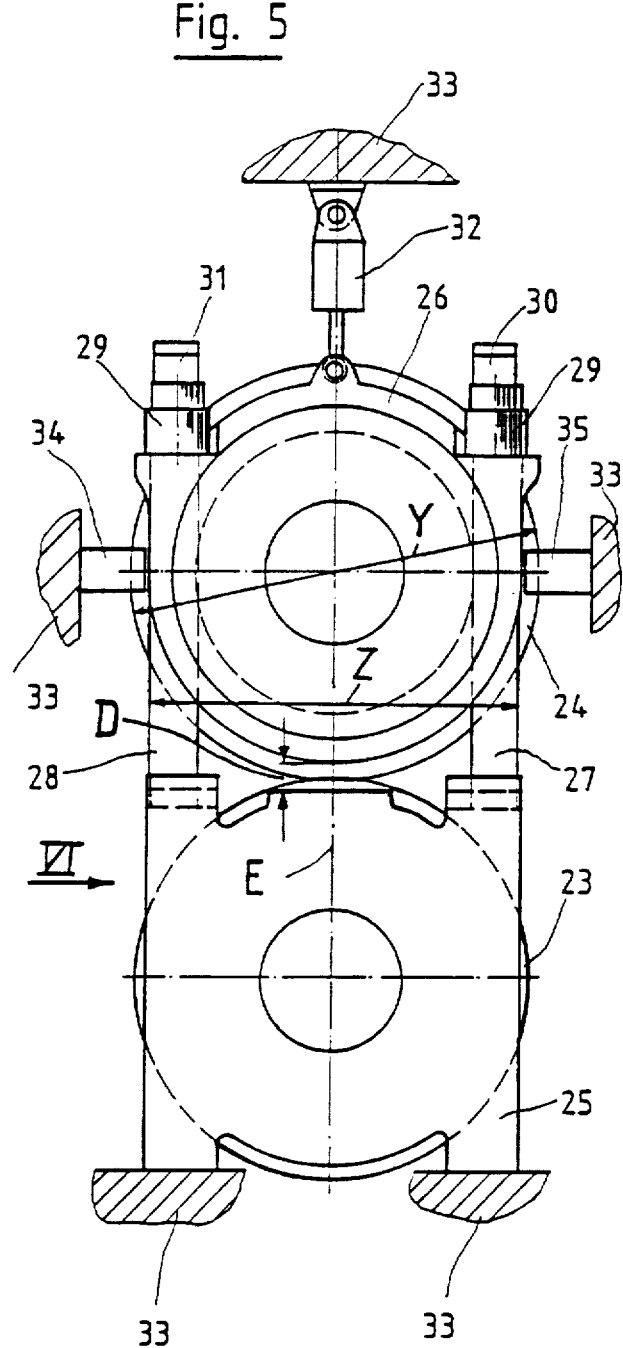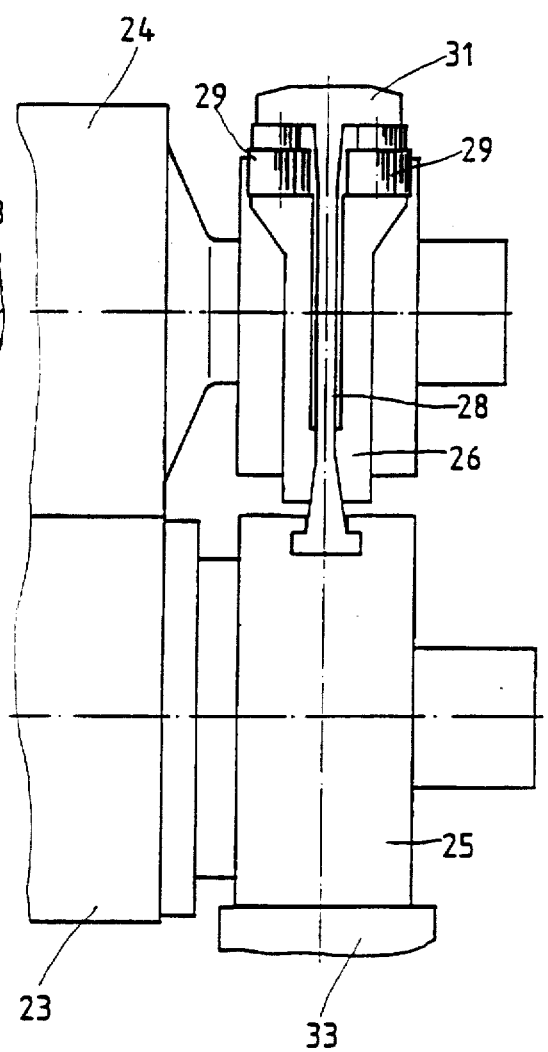

TENSION BARS FOR ROLL PRESS FOR PAPER MAKING MACHINE

BACKGROUND OF THE INVENTION

This is a division of application Ser. No. 07/946,325, filed Nov. 6, 1992, now U.S. Pat. No. 5,291,826.

The present invention relates to a roll press having a first press roll and a second press roll the principal axes of which lie in a press plane and which form a press nip with each other. The invention proceeds from a roll press having a first press roll and a second press roll which cooperate to form a press nip. The principal axes of both of the press rolls lie in a press plane. Each press roll has a rotatable shell. There are journal pins at both ends of the press rolls. Either a rotatable shell has a rotatable journal pin or a stationary support extends through the roll shell and has stationary journal pins. Both of the press rolls are supported at their journal pins on a respective bearing pedestal for the journal pin. At least one bearing pedestal at one end of one of the press rolls is coupled to the other bearing pedestal at the same end of the press rolls by at least one and more usually by two detachable tension bars. The two tension bars are located at both sides of the press plane, extend substantially parallel to that plane and extend in a direction perpendicular to the principal axes of the press rolls. These features of a roll press are known from U.S. Pat. No. 3,921,514.

In one embodiment of the known roll press, the first press roll is located in the lower position and the second press roll in the upper position. Thus, the bearing pedestals of the first press roll are on a stand, foundation or the like. From U.S. Pat. No. '514, however, the reverse arrangement is also known, in which the bearing pedestals of the first (in this case upper) press roll are suspended from the bottom of a stand. The invention concerns both arrangements. Furthermore, the known roll press is developed in the manner that the bearing pedestals in which the second press roll rests are rigidly attached to the bearing pedestals of the first press roll by tension bars. The tension bars comprise developed as screws and, in a loaded condition of the roll press, the screws must transmit high tensile forces which result from the pressing force prevailing in the press nip. It must be borne in mind in this connection that such press rolls are used preferably in paper manufacturing machines, the width of which may in extreme cases amount to up to 10 m. Furthermore, certain roll presses (for instance in accordance with U.S. Pat. No. 4,503,765;) are developed as shoe presses in which the linear force prevailing in the press nip may reach an order of magnitude of 1000 kN/m.

To be sure, in the case of the object of U.S. Pat. No. '514, the pressing forces are kept away from the machine stand so that the machine stand only has to bear at most the weight of the roll press itself. However, there is the problem that the screw connections become extremely bulky and expensive. Furthermore, the screws must be under a considerable initial stress, which, according to U.S. Pat. No. '514, must be greater than the maximum pressing force. In other words, the screws are strongly stressed even in the unloaded condition of the roll press. Therefore, the mounting of the screws can be effected only at enormous expense.

Upon the use of the known roll press in the press end of a paper manufacturing machine, there is the further complication that at least one endless felt belt must pass through the press nip and that such felt belt must be replaced at regular intervals by a new felt belt. For this purpose, each time a felt belt is replaced it is necessary to loosen the screw connections and then prestress them again after the new endless felt belt has been introduced. These are very cumbersome and time-consuming operations in view of the bulk of the screw connections and the high initial stressing of the screws required.

Another problem in connection with such roll presses is that in the case of each press roll at least one of the two journal pins must be displaceable in an axial direction under the full operating load because of the thermally caused changes in length of the rotatable roll shell or the stationary support which occur periodically. In the case of a rotatable journal pin, therefore the outer ring of the antifriction bearing, for example, must be displaceable in the bearing housing. Or in the case of a stationary journal pin, the journal pin must be axially displaceable in a sleeve (or bushing). In both cases, slide surfaces must be provided which are suitable for transmitting the immense press forces and at the same time permit the necessary axial displacement.

SUMMARY OF THE INVENTION

The object of the present invention is further to develop the known roll press so that at least on one of the two ends of the roll press, a rapid loosening and reestablishing of the coupling between the bearing pedestals of the two press rolls is possible and that, at the same time, the previously required slide surface for the axial displacement of the journal pin can be dispensed with at least in the second press roll.

The inventor has found that both problems can be solved by use of detachable tension bars which have little tension in the unloaded condition of the press rolls. The tension bars are movable essentially in the direction of their principal axes or directions of extension, such that in the loaded condition of the roll press, the bearing pedestal of one press roll is movable in the press plane relative to the other bearing pedestal. As another feature, as seen in a cross section across the roll axes, the distance generally in the radial direction, between the outer sides of the two tension bars on opposite sides of the press plane is substantially the same size as or is smaller than the diameter of the larger one of the two press rolls. In accordance with the present invention, the previously rigid coupling of the bearing pedestal of the second press roll to the bearing pedestal of the first press roll can be omitted. This is because the conventional tension bars are no longer developed as screw connections which are to be prestressed, but according to the present invention, the tension bars are under little tension, i.e. at least substantially free of stress in the unloaded condition of the roll press so that the tension bars can be easily detached and just as easily mounted again, for instance upon the aforementioned replacement of the felt belt. Nevertheless, the tension bars can readily dimensioned so that they can transmit the enormous tensile forces from one bearing pedestal to the other.

The expression "little tension" means that the tension bars, when the roll press is not under load, are slightly prestressed, for instance only by the weight of one of the press rolls itself or, for instance, by means of a spreading device. The loaded condition of the roll press is always characterized by the fact there is a distance (or "play") between the two bearing pedestals which are connected by the tension bars. As will be explained further below, there are various structural embodiments. In one embodiment, the distance between the two bearing pedestals is established only by the loading of the roll press. In other embodiments, the distance is continuously present but is increased under the load. In all cases, this distance, because of a further inventive feature of the tension bars being movable, makes it possible for the two bearing pedestals to be movable relative to each other in the press plane, particularly in the direction of the principal axes. As a result, at least in the second press roll, the bearing pedestal can be rigidly coupled to the journal pin and nevertheless longitudinal elongation (for instance, caused by heat) is possible. In addition, this structure allows for an inclining of the journal pin, which can be caused by a sagging of the press roll. The aforementioned movability of the tension bars is to be understood in the sense that the tension bars are movable essentially in the direction of the principal axes of the press rolls, and therefore at least approximately parallel to the press plane. The movability of the tension bars could be assured by coupling them to the bearing pedestals by means of swing bearings. In accordance with the invention however, flexurally soft tension bars are preferred, as will be explained further below.

Another important aspect of the invention concerns the problem that, in many cases, one of the two press rolls is to be developed as a long-nip press roll. It may also happen that in the position of the second press roll, for example, a normal press roll with a metal roll shell is to be arranged some of the time and a long-nip press roll with a flexible press shell some of the time. Therefore, in accordance with a further concept of the invention, the tension bars are arranged so that the distance between the outsides of the tension bars is at most, only very slightly greater, if at all, than the diameter of the larger of the two press rolls. By the use of this feature, it is possible to keep the outside dimensions of the bearing pedestals, seen in the axial direction, so small that, after the removal of the tension bars, replacement of the flexible tubular roll shell of a long-nip press roll is possible without removing the corresponding bearing pedestal. It is important to employ this feature even when the roll press initially has two normal press rolls with metal roll shells. In this way, it can be converted at relatively little expense into a long-nip press.

From U.S. Pat. No. 4,272,317, a long-nip press device of a different type is already known in which a support for a press shoe and for the guide rolls of a revolving press belt is suspended by means of tension bars from stand parts arranged on top. The bearing pedestals for a press roll also are suspended from these stand parts. To be sure, the tension bars of this known press device are also loaded in the unloaded condition of the press device only by the weight of the support itself (including the parts fastened to it). These tension bars are also movable in the direction of the principal axes. Since, however, seen in axial direction, the tension bars lie outside the contour of the bearing pedestal of the press roll, it is not possible to use this known arrangement in a two-roll press in which a press shell must be replaced in the axial direction. It is therefore an essential feature of the invention that the tension bars are arranged at the smallest possible distance from the press plane and are coupled directly to the bearing pedestals.

In accordance with the invention, where the roll press is a long nip roll press having one long press nip, the bearing pedestals have arms which serve for the coupling of the tension bars and which, at least in the case of the bearing pedestal of the long-nip press roll, lie completely, or at least to the greatest part, within the contour of the roll shell when viewing the bearing pedestal in the axial direction.

The features described above can be realized, in principle, with swingable tension bars, namely bars which are articulately connected to the bearing pedestals, with the pivot pins lying perpendicular to the press plane. However, such a construction requires a large amount of space in the axial direction when the tension bars must be brought into a position approximately parallel to the axis for the replacement of the felt belt or roll shell. In accordance with another important concept of the invention, it is therefore provided that each of the tension bars is flexurally soft in the direction of the press-roll principal axes. In this case, it is possible to provide a swing bearing at one end of each tension bar, the axis of the bearing being arranged parallel to the press plane or forming an acute angle with the press plane. In this way, the tension bar can be swung out laterally (into a position perpendicular or oblique to the press plane).

Differing from this possible embodiment, however, it is provided, in accordance with the invention, that each of the flexurally soft tension bars has the shape of an I. Thus, each tension bar has at each of its two ends a rigid "head", preferably a hammer head. In the loaded condition of the roll press, these heads are seated immovably in the bearing pedestals so that the relative movability of the two bearing pedestals with respect to each other is possible solely on the basis of the flexural softness of the tension bars. This inventive concept is reduced to practice most simply in the manner that the individual tension bar is constructed of a leaf spring, the "leaf plane" of which is substantially perpendicular to the press plane. In this way, the tension bar is flexurally soft solely in a plane parallel to the press plane. In other words, the flexibility of the tension bar parallel to the press plane is several times greater than perpendicular to the press plane.

Tension bars of the type described can also be used in press devices of other type or, for instance, in rolling mills, calendars, or the like.

The installation and removal of the tension bars is preferably effected by a linear movement of the tension bars in a direction perpendicular to the press plane. The tension bars can therefore be inserted into recesses in the bearing pedestals from the side. The individual tension bar can for this purpose have a transverse hole into which a bolt supported on the machine stand extends. This is advantageous, in particular, when the press plane is arranged vertically and the bolt thus extends in a horizontal direction.

The tension bars must, on the one hand, have a certain minimum length in order to be sufficiently flexurally soft. On the other hand, they should not be too long, so that they take up as little space as possible. One particularly favorable arrangement has the tension bars each having a length of at least 0.5 meters, and preferably a length in the range of 0.7 to 1.5 meters. One end of each tension bar is coupled, at a location close to the central plane of the long nip press roll and also perpendicular to the press plane, to the bearing pedestal of the long nip press roll. The other end of each tension bar, which is close to the press nip plane, is also perpendicular to the press plane, and extends through the press nip, is coupled to the bearing pedestal of the other press roll. For ease of installation and removal of each of the tension bars in their respective pedestals at one end of the roll press, a slot is provided in each of the bearing pedestals for sliding the tension bars in and out of the pedestals. A simple slot may be provided in the bearing pedestal of the long nip press roll and a T-shaped groove may be provided in the bearing pedestal of the other press roll.

It is obvious that the width of the tension bars, measured perpendicular to the press plane, is dependent on the amount of the tensile force to be transmitted and thus primarily on the width of the machine and therefore on the length of the press nip. In order that the tension bars can be removed and installed even in the case of a very large width of the tension bar as far as possible without the use of a lift or hoisting device, it may be advantageous to divide the individual tension bar into several individual tension bars over its width. Thus, the expression "tension bar" is to be understood in such a way that either an individual tension bar or a group of tension bars is meant.

The invention differs fundamentally from the aforementioned known roll press described in U.S. Pat. No. 4,503,765. In that case, a frame-shaped stand is provided, the one bearing pedestal being fastened to a lower part of the stand and the other bearing pedestal to an upper part of the stand. Since there is no direct coupling between the support element and the bearing pedestals, it is necessary here for detachable connecting elements which transmit the tensile forces resulting from the pressing force to be provided between the two parts of the stand. Therefore, the problem described at the beginning is not solved but only shifted into the stand, and the stand itself must be dimensioned for the high tensile forces. In the object of the invention, thus known feature is retained so that the tensile forces are kept away from the machine stand. The machine stand can therefore be relatively light, since it need be designed essentially only for the dead weight of one of the two press rolls or of both press rolls.

In a first group of embodiments, the first press roll, which is supported on the stand, is located in the lower position and rests on the stand and the second press roll is in the upper position. In this case, the support element of the second press roll rests, at least in the unloaded condition of the roll press, on the bearing pedestal of the first press roll. Since the tension bars are now mounted without substantial prestress, a distance between the bearing pedestals results in the loaded condition of the roll press. In this way, in the loaded condition of the roll press, the axial displaceability and inclinability of the one bearing pedestal relative to the other one is assured.

In another group of embodiments of the invention, the following is provided in the unloaded condition of the roll press. The two press rolls are supported independently of each other in the machine stand similar to the arrangement in U.S. Pat. No. 4,505,765. The bearing pedestal of the one press roll therefore preferably rests on a lower part of the stand and the bearing pedestal of the other press roll is suspended from an upper part of the stand so that a distance is always present between the supporting element and the bearing pedestal. Differing from U.S. Pat. No. '765, it is now provided, however, that in the loaded condition of the roll, a transmission of force takes place by means of the tension bars directly from one bearing pedestal to the other. In this way, the result is again obtained that (as already mentioned) the tension forces are kept away from the stand and that, at the same time, the bearing pedestals are movable relative to each other.

BRIEF DESCRIPTION OF THE DRAWINGS

Further advantages and developments of the invention will be explained below with reference to embodiments shown in the drawing, in which:

FIG. 1 is a side view of a roll press, seen in the direction of the arrow I in FIG. 1a;

FIG. 2 shows an individual leaf-spring tension bar (on a scale about 3-times larger than in FIG. 1A);

FIG. 3 is a side view, seen in the direction of the arrow III in FIG. 2;

FIG. 4 shows a tension bar similar to that in FIG. 2, in deformed condition;

FIG. 5 is a side view of another embodiment of the invention;

FIG. 6 is a view seen in the direction of the arrow VI in FIG. 5;

DESCRIPTION OF THE PREFERRED EMBODIMENTS

Figure 1:
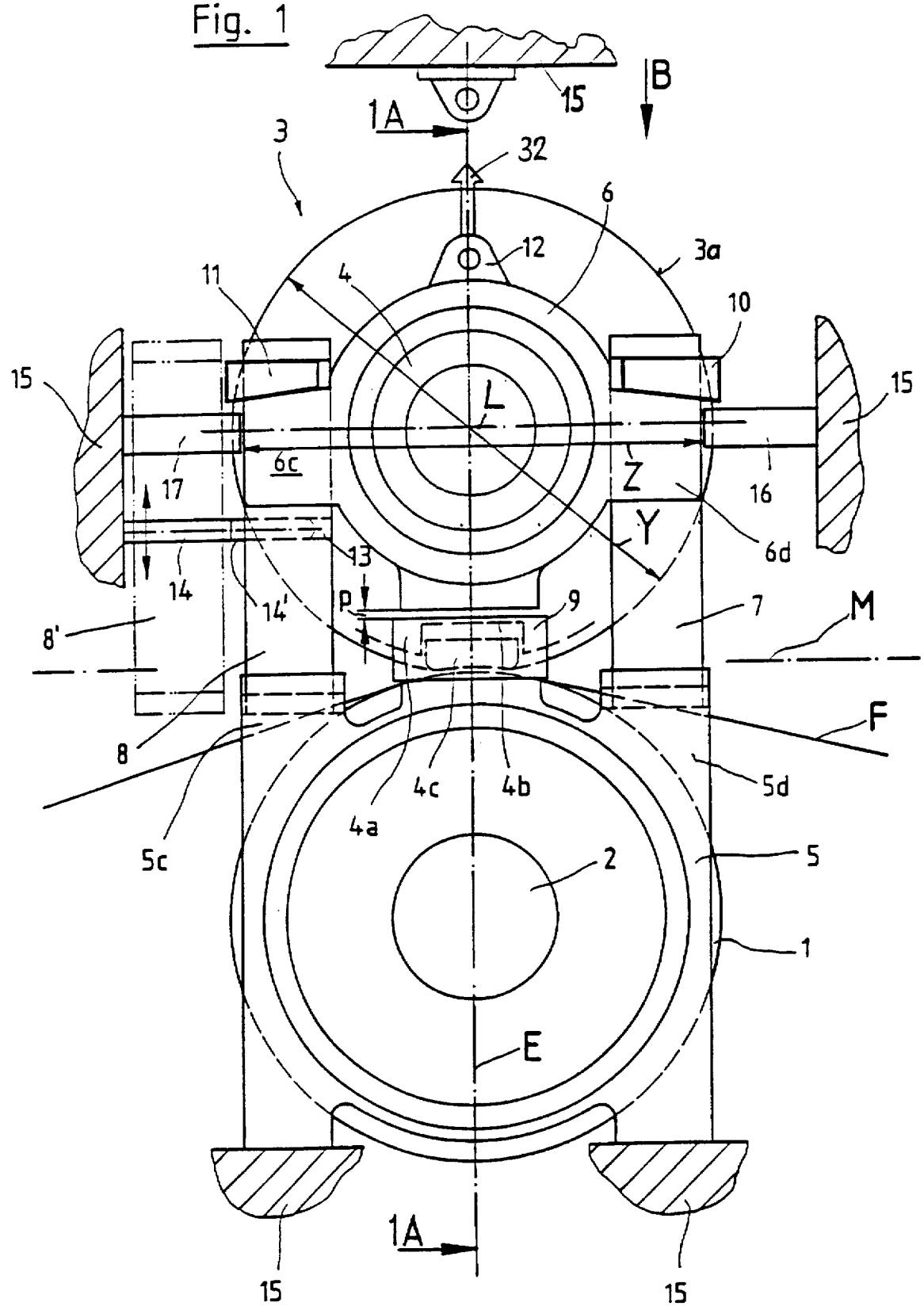
Figure 1A:
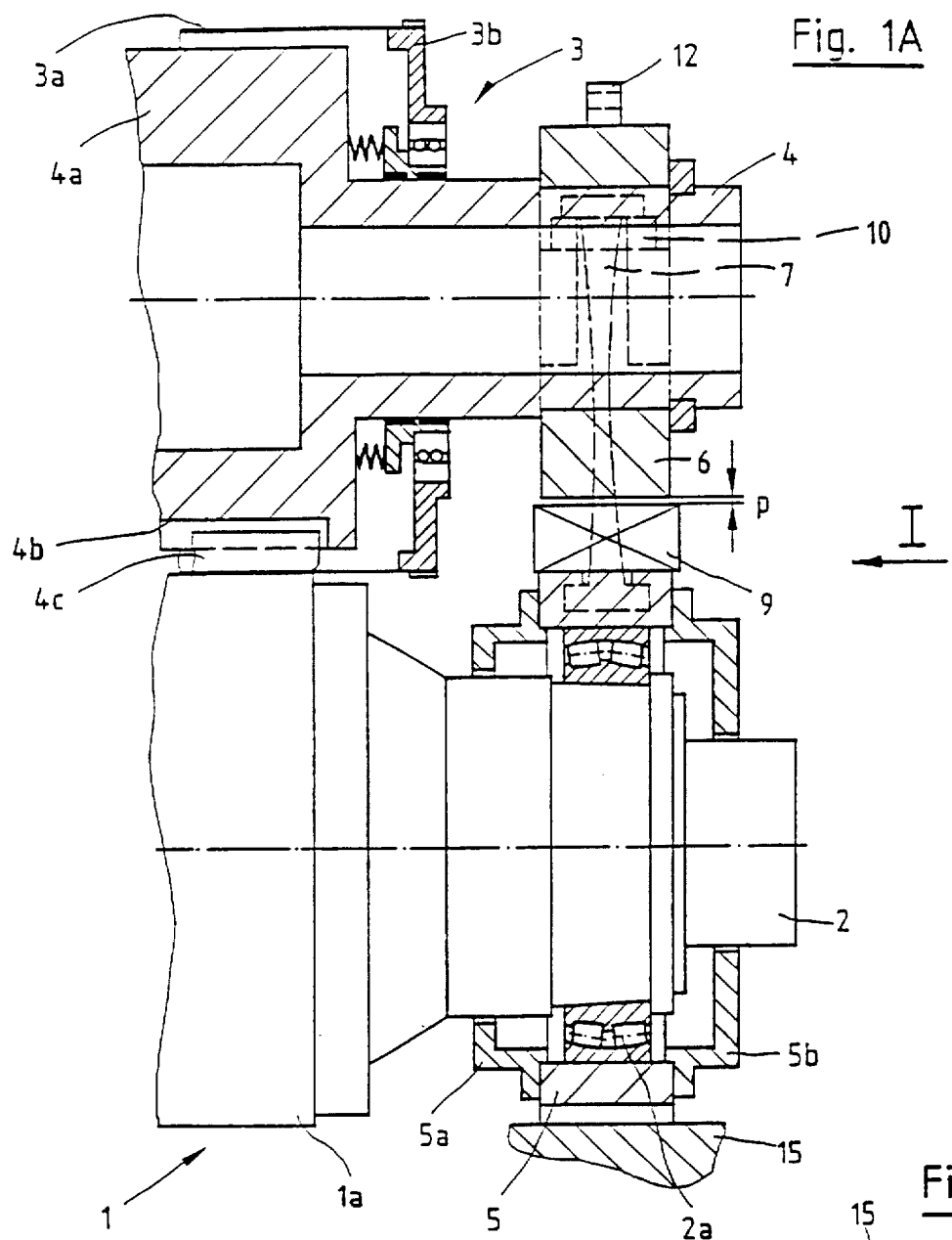
FIG. 1A is a longitudinal section along the line 1A—1A in FIG. 1 looking in the direction of arrows 1A.
Figure 1B:
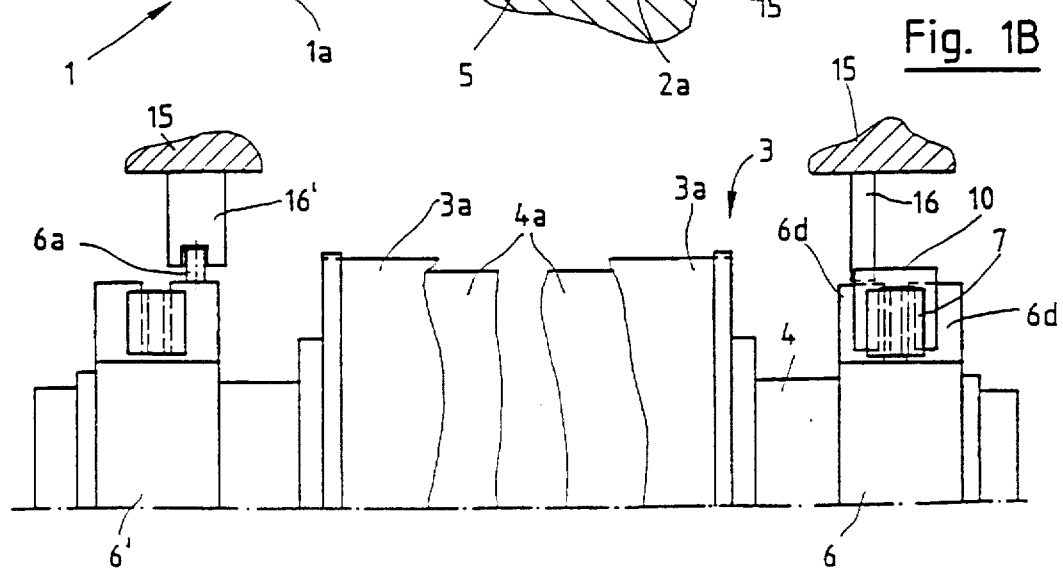
FIG. 1B is a partial view from above, seen in the direction of the arrow B in FIG. 1.

The roll press shown in FIGS. 1, 1A and 1B has a bottom first press roll 1 and a top second press roll 3. The principal axes of these press rolls (namely, the axes of rotation in the examples shown) lie in a press plane E. The first press roll 1 has a turnable roll shell 1A and a journal pin 2 fastened to it which rests, via an antifriction bearing 2a (preferably a self-aligning roller bearing), in a bearing pedestal 5 (with covers 5a and 5b). The bearing pedestal 5 rests on a frame-shaped machine stand 15, a few parts of which are shown in FIG. 1. The antifriction bearing 2a can be axially displaceable in the bearing pedestal 5 so as to permit a change in length (for instance, caused thermally) of the press roll 1. For this purpose it is, however, also possible to couple the bearing pedestal 5 in an axially movable manner to the machine stand 15 (for instance, in accordance with U.S. Pat. No. '317, already mentioned above).

The upper, second press roll 3 is a so-called long-nip press roll. Its rotatable roll shell 3a is a tubular flexible press shell which is fastened to two rotatable shell support disks 3b. Each shell support disk rests on the stationary journal pin 4 of a stationary support body 4a which extends through the inside of the roll shell 3a. Differing from the arrangement shown in FIGS. 1 and 1a, the axis of rotation of the roll shell 3a can be arranged to be eccentric with respect to the main axis of the support member 4a. The support member 4a has a recess 4b facing the lower press roll 1 and a piston-like, hydraulically actuatable press shoe 4c located within the recess 4b. Its concave slide surface presses the press shell 3a against the lower press roll 1 in order thereby to form a lengthened press nip (in direction of travel). A paper web from which the water is to be removed travels through it, together with at least one endless felt belt F. The upper press roll 3 rests (at each roll end) by means of the journal pin 4 in a bearing pedestal 6. Between the bearing pedestals 5 and 6, there is a removable intermediate piece 9 which lies on the bearing pedestal 5. The bearing pedestal 6 of the upper press roll 3 rests on the intermediate piece when the roll press is in its unloaded condition, i.e. when the recess 4b is without pressure. However, the drawing shows the loaded condition in which the press shoe 4c exerts a pressing force on the lower press roll 1. The forces of reaction resulting therefrom are transmitted to the bearing pedestal 5 from the bearing pedestal 6 by flexurally soft tension bars 7 and 8.

In accordance with FIG. 1, a flexurally soft tension bar 7, 8 is provided on each side of the press plane E. These tension bars are inserted from the side into recesses in the bearing pedestals 5 and 6 in the direction toward the press plane and are removed in the opposite direction out from the press plane. Each of the flexurally soft tension bars 7, 8 has a hammer head 20 on each of its ends and is preferably constructed of a leaf spring, the so-called "leaf plane" of which is perpendicular to the press plane E. In this way, the tension bars 7, 8 can deform as shown in FIG. 4, if the support body 4, 4a of the second press roll 3 experiences a change in length (for example, caused by heat) and/or bends under the pressing force. Accordingly, the bearing pedestal 6 can be rigidly connected to the journal pin 4. Thus the axial slide surface previously required between these two structural parts can be dispensed with, as can a spherical bushing. Due to a bending of the support member, journal pins 4 and bearing pedestal 6 are jointly inclined. In this connection it is important that only a single tension bar 7 and 8, respectively, is provided on the two bearing pedestals, preferably in the center of the bearing pedestal 6' (see FIG. 1A).

In addition to the flexural softness of the tension bars, however, the following requirement must also be satisfied in order to assure easy axial displaceability and/or inclinability of the bearing pedestal 6 (in case of a change in the length or bending of the support member 4, 4a). In the unloaded condition of the roll press, the tension bars 7, 8 are either not prestressed at all or only very slightly prestressed. As a result, the bearing pedestal 6 of the upper press roll 3, in the loaded condition of the roll press, lifts off slightly from the intermediate piece 9. In other words, play p is established between the bearing pedestals 5 and 6. The amount of this play can be determined in the manner that a U-shaped wedge 10, 11 is pushed to a greater or lesser extent at each of the tension bars 7, 8 between the hammer head 20 and the support element 6. If necessary, the tension bars 7, 8 can be placed under a slight initial stress in the unloaded condition of the roll press by means of these wedges.

The introduction of a new endless felt belt F into the roll press is effected, of course, in the unloaded condition, namely from one end of the roll, in the direction indicated by the arrow I in FIG. 1A. In this connection, therefore, the upper press roll initially rests on the intermediate piece 9. The wedges 10, 11 are first removed at both ends of the roll and then the tension bars 7, 8. The upper press roll 3 is now lifted by means of a hoist (symbolically indicated by arrow 32) acting on the lugs 12, the intermediate piece 9 is removed, and the endless felt belt F is introduced. There, the intermediate piece 9 is again inserted and the press roll 3 placed thereon, whereupon the tension bars 7, 8 and the wedges 10, 11 are again mounted. This work can be done within a relatively short period of time as compared with the time expended in the previous constructions. The same procedure is carried out in order to replace the flexible roll shell 3a with a new one.

FIGS. 2 and 3 show further details of a flexurally soft tension bar 8, also referred to as an "I-bar." In order that the tension bar can transmit the greatest possible tensile forces and, at the same time, elastically follow the above-described displacements of the bearing pedestal 6, the tension bar 8 has a thickness which is varied an optimized manner over its length. The tension bar 8 has a middle section 18 of smaller thickness s, similar to a leaf spring. This middle section 18 (lying in the so-called "leaf plane") is connected to the hammer heads 20 (according to FIGS. 1A and 2, 4) by wedge-shaped intermediate sections 19. Instead of the wedge-shaped intermediate sections, rounded transitions can also be provided. The width b of the tension bar 8 is the same (looking onto the front side of the press rolls 1, 3) over its entire length; see FIG. 1 and the shape shown in solid line in Pig. 3. Differing from this, at least one of the heads 20 can have an even greater width, as indicated by dash-dot lines in FIG. 3. In each case, the width b is several times greater than the thickness s, so that extremely high tensile forces can be transmitted. At the same time, the tension bar 8 is extremely flexurally elastic, the flexibility of the tension bar being several times greater transverse to the leaf plane than in the leaf plane itself. Thus, strong deformations of the tension bar in the direction of the principal axes are possible.

FIG. 4 shows this flexibility in the example of the tension bar 8. In this case, a displacement of the one hammer head 20 with respect to the other by the amount x has taken place. The contour shown in solid line corresponds approximately to the shape which the I-bar assumes under maximal elastic deformation as compared with its original shape, which is indicated by the dash-double-dot lines. In this connection, the bend is concentrated primarily on the transition zones from the middle section 18 to the wedge-shaped sections 19.

The length of the middle section 18 can be about one third (FIG. 2, solid lines) to about 9/10 (FIG. 2, dash-dot lines) of the total length of the tension bar 8. In the wedge-shaped intermediate sections 19, the thickness of the tension bar 8 increases continuously to 1.5 to 3 times the thickness s of the middle section 18.

The length of the flexurally soft tension bars 7, 8 is at least half a meter and in the case of large roll presses, however, preferably 0.7 to 1.5 m. In FIG. 1, a central plane extending perpendicular to the press plane E and through the press nip is designated M. On the bearing pedestal 5 there are developed arms 5c and 5d which extend in the direction of the plane M of the press nip. In each arm there is a T-groove which is open towards the top to receive one of the tension bars 7, 8. The bearing pedestal 6 has on each side, approximately at the height of the central plane L (in which the axis of rotation of the roll lies) two arms 6c and 6d and, between them, a slot, again in order in each case to receive one of the tension bars 7, 8.

The cross section and material of the tension bars are selected so that the so-called yield point of the tension bar is reached when the normal maximum pressing force of the roll press is exceeded by about 50 to 100% as the result of a disturbance, for instance should a foreign body enter the press nip. In other words, the tension bar forms a place of intended breakage which prevents greater damage in the event of a disturbance.

The installation and removal of flexurally soft tension bars 7, 8 can be effected by hand in the case of smaller roll presses, or with the use of a conventional lifting mechanism, for instance a pedestal and pulley or pneumatic cylinder, in the case of larger roll presses. For further accelerating the installation and removal of the tension bars 7, 8, the following can, however, be provided, as shown on the example of the tension bar 8 in FIGS. 1 and 3. In the center of the middle section 18 there is provided a thickening 21 through which a transverse hole 13 extends. This hole extends in the direction in which the tension bar 8 is inserted into the recesses in the bearing pedestals 5 and 6. On the machine stand 15 there is provided a bolt 14 which extends into the transverse hole 13. The bolt 14 serves as slide path for the tension bar 8 upon its introduction and removal. After the moving out of the tension bar 8 it is in the position designated 8' (FIG. 1). Here, the tension bar 8' can be swung by about 90° in order to facilitate the introduction of the new endless felt belt F. It may be advisable to support the bolt 14 for vertical displacement on the stand 15, as symbolically indicated by the double-ended arrow. The outer end 14' of the bolt can be unscrewed in order to permit the axial installing and removal of the upper press roll 3 (or merely of the press shell 3a).

The thickening 21 with hole 13 and the bolt 14 can also be dispensed with in the case of large tension bars (FIGS. 4 and 7), in the manner that an individual tension bar (for instance, 8') is divided into several individual tension bars 8a, 8b and 8c. Together they form a tension-bar group 8'. The width of each individual tension bar 8a, 8b, 8c is only a fraction (for instance, a third) of the width b of the entire tension-bar group 8'. In order to secure the position of the divided tension bars, fixed stops 5e, 6e are provided in the inner region and removable stops 5f, 6f in the outer region (shown only on the one tension-bar group 7').

FIG. 1 shows a centrally arranged intermediate piece 9. Instead of this, intermediate pieces could also be arranged on the tension bars 7 and 8 or they could be fastened to the tension bars, for instance, by screws.

The bearing pedestal 6 of the upper press roll 3 is guided parallel to the press plane E by means of removable jaws 16 and 17 which are fastened on the machine stand 15. Similar jaws 16' (FIG. 1B) are located on the other end of the roll. All of these jaws force the principal axis of the upper press roll 3 to always remain parallel to the principal axis of the lower press rolls 1. The jaws 16' arranged on the other end of the roll have the additional task of fixing the position of the upper press roll in the axial direction, for instance in the manner that the jaw 16' grips around a ledge 6a arranged on the support element 6' (FIG. 1B).

In order that, in the case of the long-nip press roll 3, the aforementioned replacement of the flexible roll shell 3a (after the removal of the tension bars 7 and 8 as well as of the intermediate piece 9 and the jaws 16 and 17) can be effected without difficulty, the following is provided. In accordance with FIG. 1 or 7, the arms 6c, 6d of the bearing pedestal 6 of the long-nip press roll 3 do not extend beyond the path of travel of the roll shell 3a. Thus, the press shell 3a can be pulled away over the bearing pedestal 6; the latter, therefore, need not be removed. During the change in shell, the end of the long-nip press roll 3 visible in FIG. 1A can be lifted in a known manner by an auxiliary device which is fastened to the pin 4. Due to the fact that, as already mentioned, the arms 6c and 6d lie within the path of travel of the roll shell 3a, it is characteristic for the invention that the distance Z between the outsides of the tension bars 7 and 8 is less than the diameter Y of the long-nip press roll 3. In general, it can be said that said the distance Z is smaller, or at most very slightly greater than the diameter Y of the larger of the two press rolls 1 and 3. This is true regardless of which of the two press rolls has the larger diameter and regardless of whether one of the two press rolls is developed as a long-nip press roll or not.

The roll press shown in FIGS. 1, 1A and 1B is, due to the radially movable press shoe 4c—a so-called self-loading roll press (in other words, a press the inner pressing device). The invention can also be employed if, instead of the long-nip press roll 3, a press roll of adjustable sag is provided, for instance one in accordance with U.S. Pat. No. 4,691,421. This is also a press roll with an inner pressing device. Other roll combinations are, However, also conceivable, including ones with an outer pressing device, for instance in accordance with U.S. Pat. No. 4,796,452. In this connection, two normal press rolls (i.e. two with rotatable roll pins) can also be used in a roll press in accordance with the invention.

Another roll press in accordance with the invention which has an outer pressing device is shown in FIGS. 5 and 6.

Here, the first, bottom press roll is designated 23 and the second, top press roll 24. These may be two normal press rolls (i.e. both with rotatable journal pins). At least one of the two press rolls, however, can also be developed as a sag-adjustment roll without internal pressing device, preferably in accordance with U.S. Pat. No. 4,414,890. The lower press roll 23 again rests in a bearing pedestal 25 which is arranged on a machine stand 33 (rigidly or displaceably). The upper press roll 24 rests in a bearing pedestal 26 which is vertically movable, a variable distance D being always present between the bearing pedestals 25 and 26. The bearing pedestals 25 and 26 are again connected by flexurally soft tension bars 27, 28, but now with the interpositioning of hydraulic cylinders 29 which exert a pressing action. These cylinders are arranged on the bearing pedestal 26 and press against enlarged hammer heads 30, 31 of the tension bars 27, 28 (again developed in the form of leaf springs).

The force of the hydraulic cylinder 29 produces the pressing force between the two press rolls 23 and 24. Another hydraulic cylinder 32 which exerts a pulling action and is pivoted to the frame-shaped stand 33 holds the upper press roll 24 when the tension bars 27, 28 are removed. The hydraulic cylinder 32 can then lift the press roll 34 further in order to create a sufficiently large space between the press rolls so that a new endless felt belt can be introduced. Guide jaws 34, 35 again where the centering of the upper press roll 24 in the press plane E. The lift cylinder 32 forms a resilient connection of the bearing pedestal 26 to the stand 33. In accordance with FIG. 5, the distance Z between the outsides of the two tension bars 27 and 28 is again less than the diameter Y of the larger of the two press rolls; in this case, this is the press roll 24. In this way, the press roll 24 can be replaced at any time by a long-nip press roll 3 in accordance with FIGS. 1, 1A and 1B. In this case, the bearing pedestal 25 of the lower press roll 23 can remain unchanged. As seen, this bearing pedestal 25 has exactly the same shape as the bearing pedestal 5 of FIG. 1.

Figure 7:
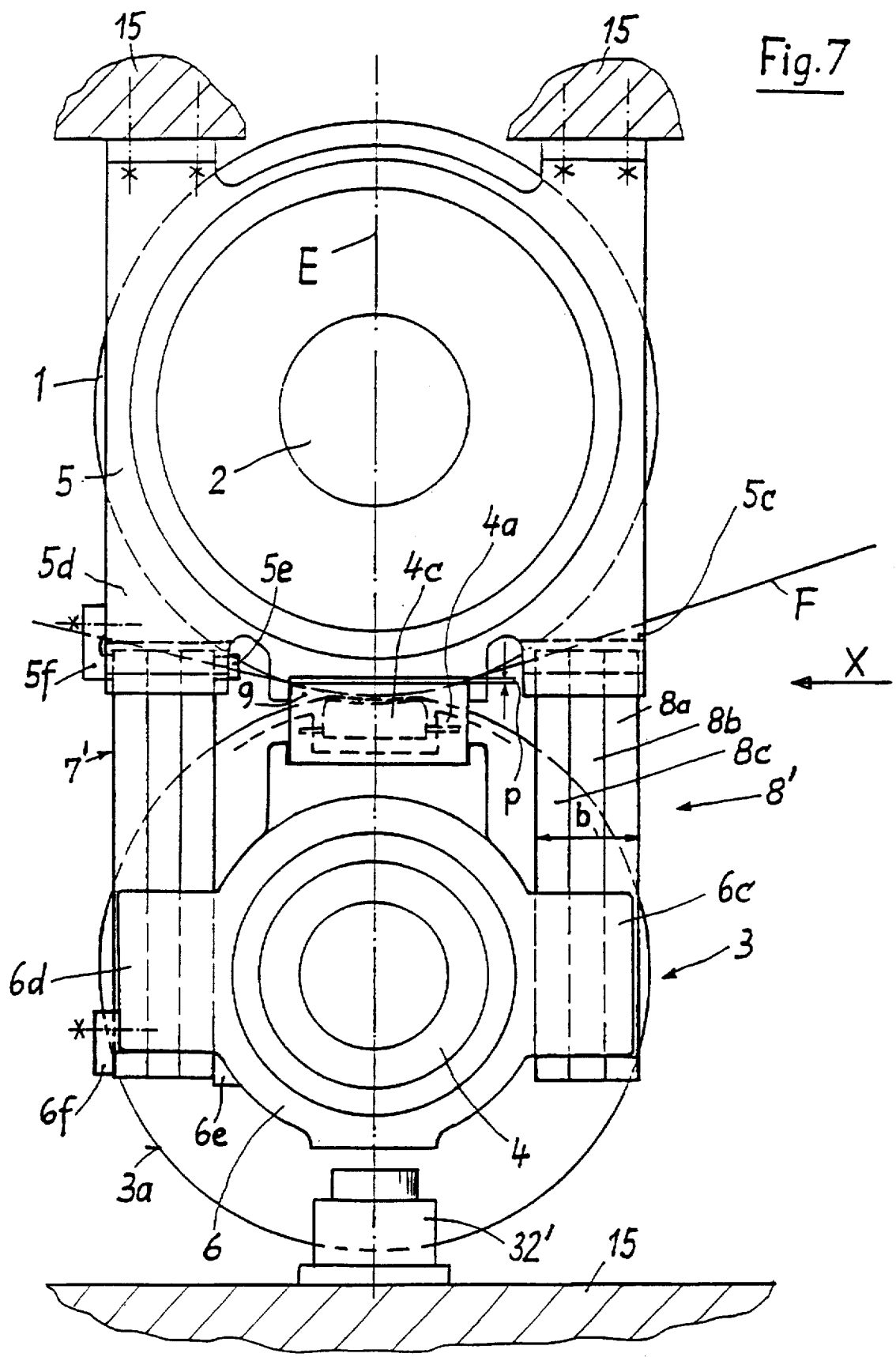
FIG. 7 is the side view of another embodiment, which differs from FIG. 1.

Further embodiments of the invention result if the variants shown are turned upside-down. FIG. 7 shows such an example. In that case, the roll press in accordance with FIG. 1 is turned 180°; i.e., the press roll 1 is suspended from the upper part of the machine stand 15 in the manner (for instance) that the bearing pedestal 5 is screwed to the machine stand 15. Furthermore, the long-nip press roll 3 (at least at the end visible in FIG. 7) hangs by means of the tension bars 7' and 8' from the bearing pedestal 5 of the upper press roll 1. The tension bars (for instance, 8'), as already mentioned, are divided into individual tension bars 8a to 8c arrayed outward from the press plane.

Between the two bearing pedestals 5 and 6, there is again a removable intermediate piece 9. Differing from FIG. 1, this intermediate piece 9 now serves primarily for the centering of the two bearing pedestals 5 and 6 with respect to each other so that the jaws 16 and 17 of FIG. 1 can be dispensed with. It can be noted that even in the unloaded condition of the roll press a small distance p is present between the upper bearing pedestal and the intermediate piece 9. For the removal of the tension bars 7' and 8', the lower bearing pedestal 6 can be lifted by a lifting device 32' which is arranged on the lower stand part 15. The lifting device is developed as a hydraulic cylinder acting by pressure. The U-shaped wedges 10 and 11 of FIG. 1 are omitted in FIG. 7 since they can be dispensed with.

Another embodiment different from FIG. 1 is not shown in the drawings; however, it is similar to FIG. 7. In accordance therewith, the long-nip press roll 3 is again arranged below the normal press roll 1; its bearing pedestals 6, however are now on the lower part of the machine stand 15. The bearing pedestal 5 of the normal press roll 1 is not suspended from the stand 15 but rests (in unloaded condition of the roll press) on the intermediate member 9. Once again, the bearing pedestals 5 and 6 are coupled to each other by flexurally soft tension bars 7 and 8 so that, again, mobility of the upper bearing pedestal 6 relative to the lower bearing pedestal 5 is assured.

Figure 8:
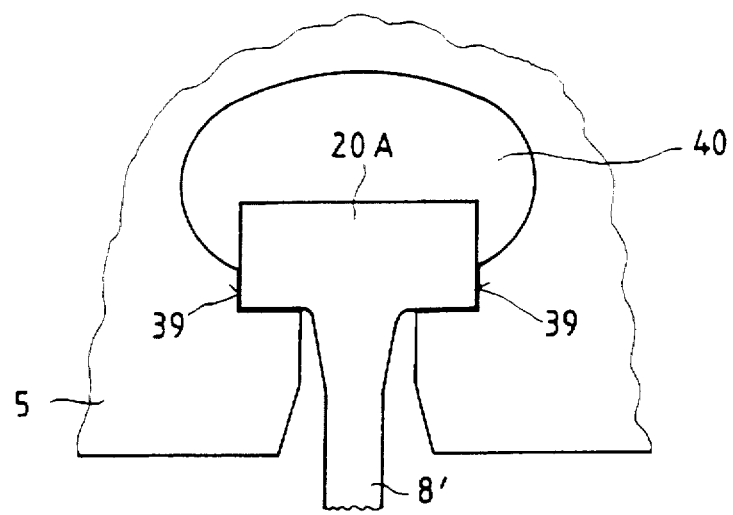
FIGS. 8, 9, and 10 show different shapes of tension bars in an enlarged partial view, seen in the direction of the arrow X in FIG. 7.
Figure 9:
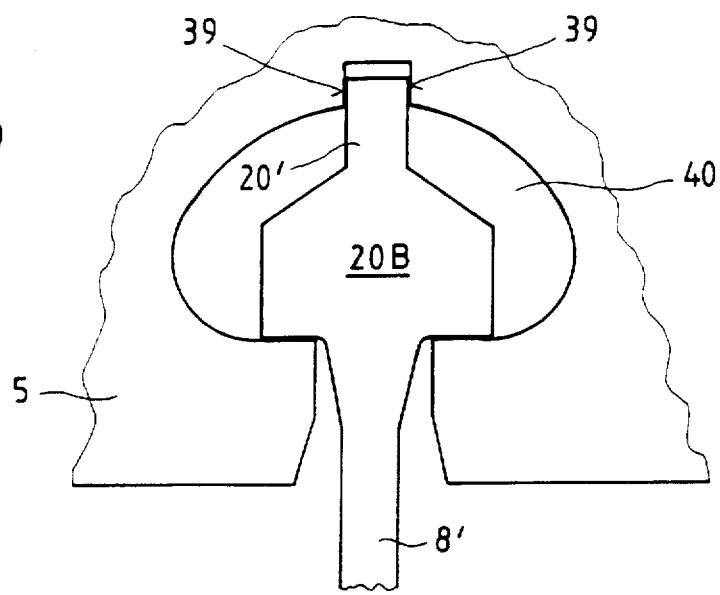
Figure 10:
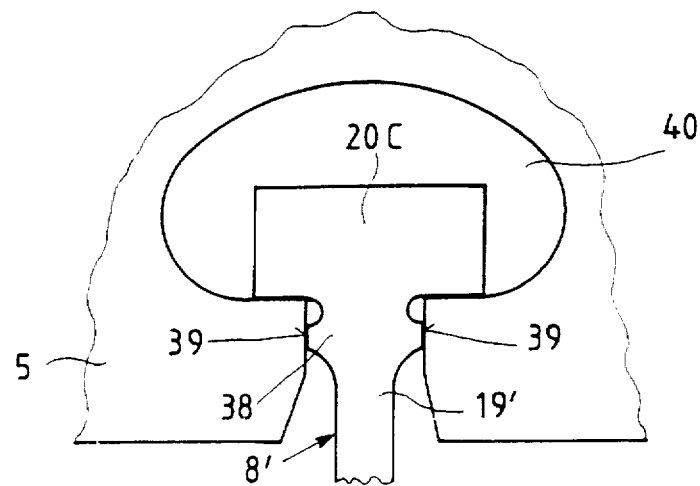

From FIGS. 8 to 10 it can be seen that the T-groove (40) in the bearing pedestal 5 (for instance FIG. 7) may have a special rounded shape in order to transmit the high tensile force introduced by the tension bar 8 as dependably as possible into the other part of the bearing pedestal. Stated more precisely, the part of the T-groove 40 surrounding the head 20A or 20B or 20C of the tension bar 8' has a predominantly round cross section. In order that the head of the tension bar 8' (despite the deformation of the tension bar shown in FIG. 4) is fixed with the greatest possible reliability in the T-groove, two support surfaces 39 are provided on the tension bar arrayed outward from the press plane substantially parallel to the longitudinal axis of the tension bar and substantially perpendicular to the press plane E (FIG. 7). These support surfaces are in contact with mating support surfaces which are provided on the bearing pedestal 5. In accordance with FIG. 8, the support surfaces 39 are provided directly on the head 2A. In other words, the support surfaces 39 are formed by the end surfaces on the two sides of the head 20A. In accordance with FIG. 9, the support surfaces 39 are provided on an extension 20' of the head 20B. In accordance with FIG. 10, the support surfaces 39 are provided on a thickening 38 of the intermediate section 19'. The thickening 38 is only at a slight distance from the head 20C. The transitions from the thickening 38 to the head 20C are developed as grooves of semicircular cross section.

I claim:

1. A paper making machine comprising:

at least two load bearing pedestals;

a tension bar extending between the at least two load bearing pedestals and being arranged to tension the at least two pedestals together while allowing the at least two pedestals to move relative to each other, which movement applies tension to the tension bar, the tension bar having a general shape of an I, including an elastic middle part which lies in a leaf plane, and including a respective head disposed at each side of the middle part at opposite ends of the tension bar, at least one head being removably mounted in one of the at least two load bearing pedestals; the tension bar having a rectangular cross-section and a width that is greater than a thickness of the tension bar, such that the flexibility of the tension bar transverse to the leaf plane is several times greater than in the leaf plane.

2. The paper making machine of claim 1, wherein the width of the tension bar in the leaf plane is several times the thickness of the tension bar.

3. The paper making machine of claim 1, wherein the tension bar further comprises a respective intermediate section located between the middle part of the tension bar and each head thereof, each intermediate section having a thickness across the leaf plane which gradually increases from the middle part to a respective head.

4. The paper making machine of claim 3, wherein the intermediate section of the tension bar is at least predominantly wedge-shaped in the thickness direction along the length direction of the intermediate section.

5. The paper making machine of claim 3 wherein the intermediate section of the tension bar has a length along a length direction of the tension bar that is within a range of about one-third to nine-tenths of a total length of the tension bar measured between the ends of the tension bar.

6. The paper making machine of claim 1, wherein the intermediate section of the tension bar has a length along a length direction of the tension bar that is within a range of about one-third to nine-tenths of a total length of the tension bar measured between the ends of the tension bar.

7. The paper making machine of claim 1, wherein the tension bar further comprises two support surfaces in the region of one of the heads of the tension bar, the support surfaces disposed substantially parallel to a longitudinal axis of the tension bar and extending across a thickness dimension of the tension bar for contacting mating supporting surfaces in a respective of the at least two pedestals which receives the respective end portion and head of the tension bar.

8. The paper making machine of claim 7, wherein the support surfaces are located directly on the head of the tension bar.

9. The paper making machine of claim 7, wherein the head of the tension bar at one pedestal has an extension located above the head, and the support surfaces are located directly on the extension above the head.

10. The paper making machine of claim 7, wherein the intermediate section of said tension bar has a thickened portion thereon and the support surfaces are located on the thickened portion.

11. The paper making machine of claim 10, wherein the tension bar is adapted to extend substantially parallel to a press plane between the two pedestals and transversely to a web passing between the pedestals and the leaf plane extending substantially perpendicular to the press plane.

12. A paper making machine comprising:

at least two rolls being arranged to form a nip between the at least two rolls;

at least two load bearing elements each supporting one of the at least two rolls;

a tension bar extending between the at least two load bearing elements and being arranged to tension the at least two load bearing elements together while allowing the at least two elements to shift relative to each other so as to tension the at least two rolls together while allowing the at least two rolls to shift relative to each other; the tension bar comprising an elastic middle portion and a first end and a second end extending from the middle portion, at least one of said first and second ends being removably mounted within one of the at least two load bearing elements; wherein the middle portion of the tension bar is located within a leaf plane and the tension bar has a rectangular cross section and a width that is greater than a thickness of the tension bar such that the flexibility of the tension bar transverse to the leaf plane is several times greater than in the leaf plane.

13. The paper making machine of claim 12, wherein the first and second ends of the tension bar have a first head and a second head formed thereon, respectively, each of the first head and the second head being received in a head retaining member formed in a respective one of the at least two load bearing elements.

14. The paper making machine of claim 13, wherein a portion of at least one of the at least two load bearing elements is located between the first head and the second head.

15. The paper making machine of claim 12, wherein the middle portion of the tension bar has a hole formed therein for receiving a guide member for guiding the tension bar into position between the at least two two load bearing elements.

16. A paper making machine comprising:

at least two rolls being arranged to form a nip between the at least two rolls;

at least two load bearing members each supporting one of the at least two rolls;

a tension bar located between the at least two load bearing members for tensioning the at least two load bearing members together so as to tension the at least two rolls together, the tension bar including an elastic middle portion, a first end, and a second end, wherein a portion of at least one of the at least two load bearing members is located between said first end and said second end, the first and second ends of the tension bar have a first head and a second head located thereon, respectively, each of the first head and the second head being received in a head retaining member formed in a respective one of the at least two load bearing members, wherein the tension bar further comprises a respective intermediate section located between the middle portion of the tension bar and each of the first and second heads, each intermediate section having a thickness across the leaf plane which gradually increases from the middle portion to a respective head.

17. A paper making machine comprising:

at least two load bearing members;

a tension bar located between the at least two load bearing members, the tension bar including an elastic middle portion, a first end, and a second end, wherein a portion of at least one of the at least two load bearing members is located between said first end and said second end; wherein the middle portion of the tension bar is located within a leaf plane and the tension bar has a rectangular cross section and a width that is greater than a thickness of the tension bar such that the flexibility of the tension bar transverse to the leaf plane is several times greater than in the leaf plane.

\* \* \* \* \*